3,227,635

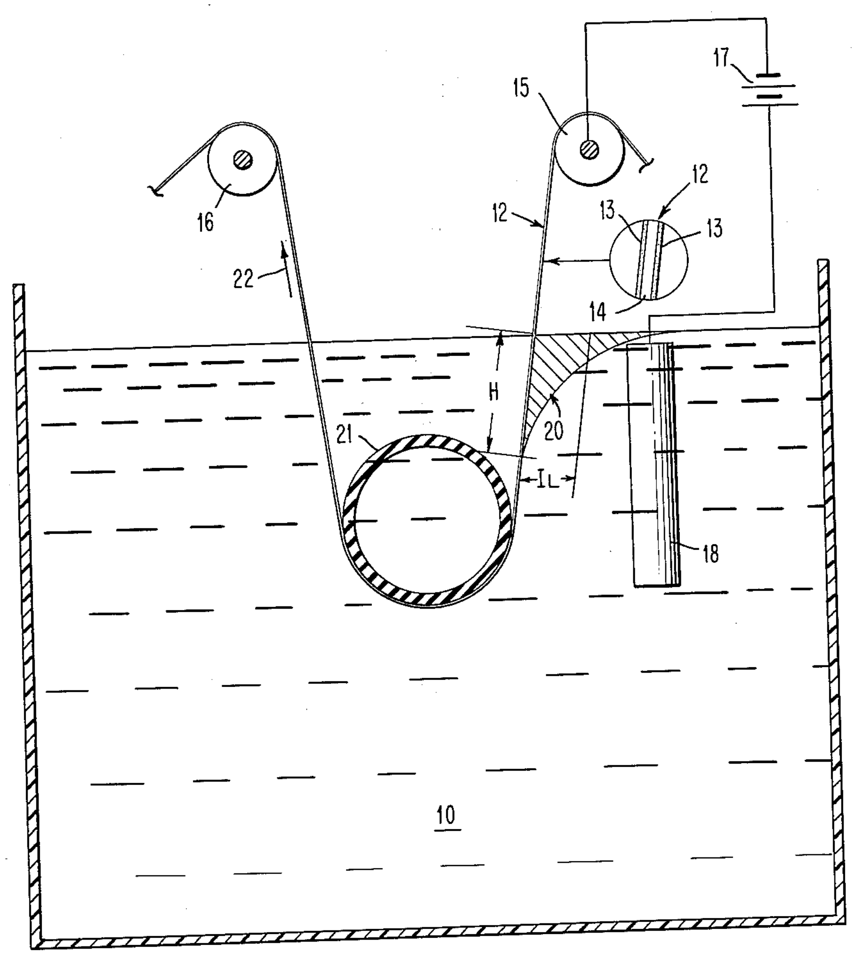
17
15
16
12
13
13
12
22
14
H
21
20
IL
18
10

METHOD OF PRODUCING MAGNETIC FILMS

Herman Koretzky and Bernard Leland, Poughkeepsie, and Rhodes W. Polleys, Hyde Park, N.Y., assignors to International Business Machines Corporation, New York, N.Y., a corporation of New York Filed Jan. 12, 1962, Ser. No. 165,806
8 Claims. (Cl. 204—28)

This invention relates to magnetic recording impulse memory devices and, in particular, to the production of electroplated films on magnetic tapes and similar recording media.

Magnetic recording tapes are highly useful in data processing systems and, in many instances, are indispensable to the operation of such systems. Several varieties of magnetic recording tapes have been proposed, some using metallic carriers while others employ plastic carriers, and there is a further distinction as to the type of magnetic recording medium used, in some instances this medium being a layer of magnetic metal and in other instances comprising a layer of magnetic oxide or the like.

The present trend in the design of data processing systems is such that magnetic recording tapes used in these systems will have to meet increasing requirements if they are to provide the higher recording densities and higher operating speeds which are contemplated. The principal requirements which should be met are as follows:

(1) The tape should have extremely low inertia and be flexible enough to travel at high speeds around bearing members such as capstans or the like;

(2) The magnetic medium should have a high coercivity and a hysteresis loop which is substantially square (squareness being defined by the ratio of $B_r/B_s$, where $B_r$ is the remanent magnetic induction and $B_s$ is the maximum magnetic induction);

(3) The magnetic medium should be contained in a layer of sufficient thinness to insure the desired recording density;

(4) The very thin magnetic layer should have wear properties sufficient to insure that it can be rubbed against a reading or recording head innumerable times at intermittent high speeds without any wear-through or any scratching which would cause error in the recorded data. The wear properties of a tape depend upon both the type of material employed and its surface smoothness.

The requirement that the tapes have low inertia and extremely high flexibility eliminates the possibility of successfully employing known tapes having solid metallic carriers in applications of the type herein contemplated. Solid metallic carriers (at least those which are presently available) have relatively high inertia and are not flexible enough to suit the purpose for which the present invention is intended. In the case of the oxide-coated plastic tapes, the carriers may have low inertia and the required flexibility, but their coatings must necessarily be thick, thereby reducing the recording density capabilities. Moreover, the limited coercivity of presently available oxide tapes causes phase shifting which limits the recording density in certain recording techniques. Furthermore, oxide tape surfaces wear rapidly during high-speed operation, particular with frequent starting and stopping.

We have discovered that we can provide a magnetic recording tape which amply meets all of the requirements hereinabove stated by electroplating a magnetic recording medium such as cobalt or a cobalt-nickel alloy upon a moving carrier comprising a plastic web bearing a conductive film or layer, provided this is done in such a manner as to fulfill certain unique conditions. The initial conductive film on the web should be made very thin. The thicker this film is, the greater will be its inertia, and if made too thick, it will tend to be brittle and develop fissures. There is another reason for making the initial conductive film very thin. The thinner the film, the higher its resistance will be, and empirical observations indicate that the desired magnetic properties (high coercivity and squareness ratio) of the magnetic metal can be significantly improved when it is electro-deposited upon a highly resistive base; so that the plating current distribution is decidedly nonuniform. Instead of using a low-resistance cathode which gives rise to a uniform current density, as done in the prior art, this invention uses a moving cathode having a resistance which is sufficiently high to cause the plating current density at the surface of the plating bath to exceed the "limiting" current density (as hereinafter defined) of the ion species being plated and which causes the plating current density to decrease to an insignificant magnitude within a short distance along the length of the carrier immersed in the bath. Thus, each incremental area of the plated film will have passed through a very wide range of current densities within a short distance of its travel in the bath. In many cases, the invention improves the coercivity of the electroplated layer by a factor of two or more over the prior technique which used a low-resistance cathode. The carrier may be caused to make multiple passes through one or more plating baths, where this is necessary to control the thickness of the magnetic film and to reduce manufacturing time.

It is a primary object of this invention to provide an improved method for electrodepositing upon a moving carrier a magnetic film which has a square hysteresis loop and high coercivity and which is sufficiently thin and uniform to afford the desired mechanical and magnetic properties.

Other objects include:

Providing a method for producing a continuous magnetic film having improved characteristics by electrodepositing such film upon a carrier having high resistivity;

Providing an improved method for producing a magnetic film having the aforesaid properties under conditions where the prior electroplating techniques would be unsuitable;

Providing a novel, economical and efficient process for electrodepositing a magnetic film on a carrier having a plastic base to meet the aforesaid requirements for a magnetic recording impulse memory device which is to be utilized in a very high-speed, high-capacity data processing system.

The figure is a partially diagrammatic illustration of an electroplating apparatus indicating the manner in which the plating current density progressively changes along a moving carrier having relatively high resistance in accordance with the invention. More specifically, this view shows a continuously moving carrier 12 (also shown in a magnified cross section within this illustration) preferably consisting of a thin conductive film 13 coated on the surface of a plastic dielectric web 14. The conductive film 13 can be applied to the surface of the web 14 by any suitable technique such as chemical plating, for example. The web surface will have been suitably pretreated to render it receptive to such plating, preferable in the manner described in U.S. patent application Serial No. 138,609, filed September 18, 1961, now U.S. Patent 3,142,581, or Serial No. 153,187, filed November 17, 1961, now U.S. Patent 3,142,582, both of which are assigned to the assignee of the present application. The pretreating and chemical plating operations, being merely incidental to the present invention, are not disclosed in detail herein.

In a preferred embodiment of the present invention web 14 bearing the conductive layer 13 thereon passes over a cathode roll 15 into a tank containing a plating bath of a type subsequently described herein. The carrier then passes around a roll 21 and out of the bath 10 over another roll 16 in the direction of the arrow 22. Direct-current source 17 has a negative terminal connected to roll 15, and it has a positive terminal connected to an anode 18 within the bath 10. The anode 18 may be of a soluble type compatible with the material being electrodeposited, or it may be of an insoluble type. The desired magnetic metal is electrodeposited upon the carrier 12 during its passage through the bath 10.

The electron current from roll 15 passes primarily down the side of the conductive film 13 contacted by roll 15. Because of the highly resistive character of the conductive film 13 on the carrier 12, as hereinabove explained, a unique type of current distribution is obtained during the electrodeposition of the magnetic medium upon the carrier 12. This conductive film does not behave as a low-resistance (massive) cathode; hence it provides a decidedly non-uniform current distribution, which is desirable for the result that we want to attain. The current density in the conductive film rapidly decreases as the distance measured along the carrier 12 within the bath 10 increases from the surface of the bath to a distance H along the carrier path below the bath surface, beyond which point the potential is so low that it produces insufficient current for electrodeposition. Curve 20 diagrammatically illustrates the progressive change of current magnitude with distance along the electrochemically active part of the carrier 12. The horizontal distance of any point on curve 20 from a corresponding point on carrier 12 is representative of the magnitude of the plating current which flows between the conductive film and the plating solution at that corresponding point. A line $I_L$ in the figure represents the magnitude of the "limiting current density" (defined presently) for the recording material being electrodeposited. The current density at any point along the carrier 12 varies from a value much greater than $I_L$ to a value much lower than $I_L$ that is insignificant for electrodeposition, and it approaches zero before the carrier 12 leaves the bath 10. "Limiting current density" is defined as the current density at which all of the ions of the species under consideration brought to the cathode are either discharged or reduced to a lower valence state. Under typical operating conditions of the kind herein contemplated, $I_L$ will be of the order of one ampere per square inch, and the distance H will be approximately two inches.

The electrodeposition process is carried out continuously as the conductive carrier 12 passes over the cathodic contact roller 15 through the plating bath 10. The bath 10 typically comprises an aqueous solution containing nickel, cobalt and hypophosphite ions. A cobalt-to-nickel ion ratio of at least 0.6:1 and a hypophosphite ion content of at least 0.15 gram per liter of plating solution is maintained. Plating baths which include cobalt but not nickel also may be employed. A nickel-cobalt alloy, or nickel or cobalt alone, serves as the anode 18. Insoluble anode materials also can be used, with the metal ions being supplied solely by the plating solution. When an electrodepositing current is applied, a magnetic film of nickel and/or cobalt is deposited on the conductive surface of the carrier. Owing to the fact that the conductive film on the carrier surface (including both the initial conductive layer 13 and the magnetic metal electrodeposited thereon) has a high resistance, there is a significant potential drop along the surface of the film undergoing electrodeposition, making the conductive surface less cathodic as it moves away from the contact roll. This produces a changing current density along the conductive surface undergoing the electrodeposition reaction, and it is this variation of current density which causes a magnetic film of the desired magnetic properties to be deposited upon the conductive film. As mentioned above, the initial current density on the surface of the conductive film (that is, the current density at the surface of the bath) has a very high value far exceeding the limiting current density for the magnetic deposit at the instant when each incremental area of the conductive film enters the bath, but within a short distance during the travel of such incremental area into the bath, its current density drops to a negligible amount.

The total current input from the contact roll 15 to the conductive layer on the carrier 12 does not have critical limits. The upper limit is determined by the maximum amount of heat which is generated by the current flowing in the conductive film without causing thermal destruction of the plastic substrate, and the lower current limit is determined by the minimum permissible plating rate and the economics of operation. For example, currents within the range of 0.2 to 2.25 amperes per inch of width have been used. Importantly, due to the high-resistance moving cathode used in the invention, the limiting current density $I_L$ will always be exceeded at the surface of the bath, even at very low input currents, but this is only an instantaneous condition for any given incremental area of the moving carrier.

Thus far, attention has been given only to the electroplating which occurs on the side of the carrier 12 contacted by roll 15, which side is closest to the anode 18. Some electroplating also occurs on the opposite side of the carrier 12. If desired, electroplating can be caused to occur at equal rates on both sides of the carrier by using additional contact and anode means (not shown). In the apparatus as illustrated, however, the plating will be of less depth on the side of the carrier remote from the anode.

In addition to nickel and/or cobalt ions, the plating bath 10 also contains hypophosphite ions, at least in the preferred forms of plating solution which are herein disclosed. Only very small quantities of the hypophosphite ions are required, and, generally, concentrations as low as 0.15 gram per liter are effective. In many cases, however, at least 0.31 gram per liter of the hypophosphite ions should be employed to secure the full benefits of their presence in the solution. There appears to be no critical upper limit on the concentration of these ions save solubility, but there is generally no advantage in employing more than 31.0 grams per liter, and in most solutions substantially the full benefits of their presence are achieved with 12.3 grams per liter or less.

By utilizing the teachings herein set forth, a magnetic recording medium having high coercivity and high squareness can be deposited on a carrier of the type having high-speed capabilities. High coercivity and squareness ensure (1) that the intensity of magnetization representing data on the medium does not vanish when the applied field is reduced to zero and (2) that the transition region between oppositely magnetized adjacent areas of the medium, respectively representing successive bits of data, are narrow to provide adequate signal output and minimum interference between adjacent spots of recorded data, thereby facilitating high density recording.

Bearing in mind that the proportions of the essential constituents may be varied without departing from the spirit of the invention, the examples tabulated below illustrate the various parameters and conditions involved in the production of a magnetic film having the required properties. In each of these examples it is assumed that the bath composition is maintained substantially constant in accordance with well known techniques.

*Table I*

| Sample | 1 | 2 | 3 | 4 | 5 | 6 |
|---|---|---|---|---|---|---|
| $NiSO_4.6H_2O$ (gms./l.) | 65 | 66 | 66 | 66 | 26.4 | 65 |
| $CoSO_4.7H_2O$ (gms./l.) | 100 | 96 | 96 | 96 | 28.2 | 100 |
| $NH_4Cl$ (gms./l.) | 100 | 100 | 100 | 100 | 27 | 100 |
| $NaH_2PO_2.H_2O$ (gms./l.) | 0.60 | 1.0 | 1.0 | 1.0 | 4.2 | 15 |
| pH | 4.5 | 3.0 | 3.0 | 3.0 | 4.2 | 4.5 |
| Temp., ° C | 50 | 50 | 50 | 50 | 48 | 50 |
| Plating Current (amps./in. of width) | 0.50 | 2.25 | 1.4 | 1.3 | 1.1 | 0.31 |
| Resistance (ohms/inch) | 13 | 2.5 | 3.3 | 4.2 | 17 | 13 |
| Coercivity (Hc) oersteds | 360 | 670 | 720 | 360 | 960 | 1,750 |
| Squareness $B_r/B_s$ | 0.64 | 0.94 | 0.87 | 0.95 | 0.87 | 0.64 |
| $Co^{++}$ (gms./l.) | 20.9 | 20.1 | 20.1 | 20.1 | 5.9 | 20.9 |
| $Ni^{++}$ (gms./l.) | 14.5 | 14.7 | 14.7 | 14.7 | 5.9 | 14.5 |
| $H_2PO_2^-$ (gms./l.) | 0.35 | 0.61 | 0.61 | 0.61 | 2.58 | 9.4 |
| $Co^{++}/Ni^{++}$ | 1.45 | 1.36 | 1.36 | 1.36 | 1 | 1.45 |
| Plating Time (seconds) | 90 | 18 | 36 | 36 | 380 | 22 |

The resistance (ohms/inch) specified above is the surface resistance of a strip one inch wide measured between a pair of gold-plated knife edges placed in parallel against the surface one inch apart and having a 500 gram nonconductive weight applied thereto. While the specific examples used in Table I contain both cobalt and nickel ions, it is necessary to have nickel present. A solution composition for a nickel-less bath has a cobalt ion content within the range between 5.9 to 105 grams per liter and a hypophosphite ion content within the range between 0.15 gram per liter to saturation. Further examples of cobalt solutions are given in Table II.

*Table II*

| Sample | 7 | 8 | 9 | 10 | 11 |
|---|---|---|---|---|---|
| $CoCl_2.6H_2O$ (gms./l.) | 135 | 135 | 135 | 150 | 150 |
| $NH_4Cl$ (gms./l.) | 100 | 100 | 100 | 100 | 100 |
| $NaH_2PO_2.H_2O$ (gms./l.) | 10 | 25.0 | 50 | .5 | 20 |
| pH | 4.8 | 4.8 | 4.8 | 3.0 | 3.0 |
| Temp., ° C | 50 | 50 | 50 | 55 | 55 |
| Current (amps./in. of width) | .5 | .5 | .5 | 1.75 | 2.25 |
| Resistance (ohms/inch) | 13 | 13 | 13 | 15 | 15 |
| Coercivity (Hc) oersteds | 650 | 1,050 | 1,050 | 365 | 2,500 |
| Squareness $B_r/B_s$ | 0.83 | 0.80 | 0.80 | 0.95 | 0.95 |
| $Co^{++}$ (gms./l.) | 33.5 | 33.5 | 33.5 | 37 | 37 |
| $H_2PO_2^-$ | 6.1 | 15.3 | 31.0 | 0.31 | 12.3 |

Solution variables such as ammonium chloride and hypophosphite concentration, temperature and pH have significant effects on the magnetic and recording characteristics of the magnetic recording tape, as reflected in the following table:

*Table III*

| Sample | 12 | 13 | 14 | 15 | 16 |
|---|---|---|---|---|---|
| $Co^{++}/Ni^{++}$ | 0.6 | 1.0 | 1.45 | 1.45 | 1.45 |
| $NH_4Cl$ (gms./l.) | 23 | 27 | 100 | 100 | 100 |
| $NaH_2PO_2.H_2O$ (gms./l.) | 4.2 | 4.2 | 0.5 | 2.0 | 20 |
| $H_2PO_2^-$ (gms./l.) | 2.6 | 2.6 | 0.31 | 1.23 | 12.3 |
| Temp., ° C | 50 | 50 | 50 | 50 | 50 |
| Current (amps./in. of width) | 0.2 | 0.2 | 0.5 | 0.5 | 0.5 |
| Resistance (ohms/inch) | 13 | 13 | 13 | 13 | 13 |
| Coercivity (Hc) oersteds | 360 | 670 | 360 | 600 | 2,000 |
| Squareness $B_r/B_s$ | Between 0.7 to 0.8 | | | | |
| pH | 4.2 | 4.2 | 4.5 | 4.5 | 4.5 |

Tables I, II, III indicate that coercivity increases as the hypophosphite ion content increases. In the present solution system being used, the hypophosphite ion concentration is about as high as is efficacious, and increasing it to saturation does not materially increase the coercivity nor affect the squareness of the deposit.

Table IV relates the effects of pH and temperature for an exemplary solution containing 18 grams per liter of cobalt ion, 12.5 grams per liter of nickel ion and 3.6 grams per liter of hypophosphite ion:

*Table IV*

| Sample | 17 | 18 | 19 | 20 | 21 |
|---|---|---|---|---|---|
| pH | 2.5 | 3.0 | 3.0 | 3.5 | 3.5 |
| Temp., ° C | 50 | 50 | 60 | 60 | 85 |
| Coercivity (Hc) oersteds | 1,200 | 1,350 | 1,275 | 1,500 | 1,150 |
| Squareness $B_r/B_s$ | .75 | .75 | 0.7 | 0.8 | 0.8 |

Coercivity tends to increase as the pH increases and decreases as the solution temperature increases. The pH has an operative range between 2.5 to 6.5. However, after 4.5 the metal ions may begin to precipitate as basic metal salts and difficulties may be encountered in regulating the properties of the magnetic film.

Ammonium chloride appears to affect the uniformity and appearance of the electrodeposited film and the uniformity of the magnetic parameters. In addition, the signal output increases with an increase in the ammonium chloride concentration and reaches a maximum at about 100 grams per liter. This is illustrated in Table V, the solution having a cobalt to nickel ion ratio of 1:1 and a pH of about 3:1.

*Table V*

| $NH_4Cl$ (gms./l.): | Signal output (millivolts) |
|---|---|
| 0 | <1 |
| 20 | 1.4 |
| 40 | 2.3 |
| 60 | 2.5 |
| 80 | 2.6 |
| 100 | 2.9 |

Various procedures are available for superimposing a nickel conductive film such as 13 on a dielectric resin web such as 14. While polyethylene terephthalate is a preferred dielectric resin, there are other materials which will serve the purpose equally as well. The film 13 may be superimposed on the web 14 by vacuum deposition, cathode sputtering or chemical deposition techniques, the process being performed in each case so as to insure smoothness and adhesion of the film to the resin surface. In the examples given above, the conductive film 13 on the web 14 was an electroless nickel film comprising 2 to 12% by weight phosphorus, having a thickness between 2 to 10 microinches, and a surface roughness on the order of 2 to 4 microinches, peak to peak. The nickel provides a source of nuclei for the bonding of the metal ions from the aqueous electroplating solution to the dielectric resin surface. In essence, it acts as a hospitable acceptor for the metal ions. Any metal capable of acting as a hospitable acceptor such as aluminum, chromium, copper, silver and gold may provide the carrier with the required bonding nuclei. The magnetic films electrodeposited in the examples described above range in thickness between 3 to 10 microinches and have surface roughness corresponding to that of the nickel layer.

The carrier may be moved in either direction through the bath during the electrodeposition processes. Thus, in one direction, each incremental area on the carrier moves first into the maximum current density region at the surface of the bath. In the other direction, each incremental area moves last into the maximum current density region at the surface of the bath. If negative potential is applied to both rolls 15 and 16, another curve similar to curve 20 in the figure would represent the current density over the length of carrier in the bath adjacent to the bath surface at the exit side of the bath, the maximum current density in this instance likewise being at the surface of the bath.

Although the preferred embodiment has been described as a one-stage process, it will be obvious to those skilled in the art that the magnetic film may be placed on the conductive surface by a multi-stage process. The total current required to produce the magnetic film is distributed among two or more stages. One or more added electrodeposited surfaces prior to a later electrodeposition does not decrease the carrier resistance beyond the point where a current distribution different from curve 20 is obtained. Thus the multiple stage process is within this invention. A multi-stage process offers the advantage of higher speed operation, inasmuch as it effectively increases the length of the carrier surface on which electrodeposition is taking place.

It will be obvious to those skilled in the art that the anions herein described are not the only ones capable of being used in the practice of this invention. For example, in addition to chlorides and sulfates, anions such as acetate, glycolate, glycinate, fluoborate, silicofluoride, sulfamate and mixtures thereof may be used. Similarly, other hypophosphite-containing materials, soluble and stable in the system described, or which will react so as to produce hypophosphite ions, may be used.

In the embodiments described above it has been assumed that the plastic web 14 is a dielectric material and that the conductivity of the carrier 12 is supplied initially by the nickel layer 13 thereon. However, it would be within the purview of the invention to utilize as a carrier a conductive plastic material having the appropriate resistivity, in which event the initial conductive layer 13 could be eliminated.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A process for forming a smooth durable magnetic film having substantial coercivity by the steps of:
   exposing an elongated nonconductive carrier having a conductive film superimposed on a surface thereof, said conductive film having an initial resistance of at least one ohm per lineal inch per inch of width as a cathode to an aqueous electrodeposition bath including a salt of a magnetic metal,
   applying an electrodeposition current to said conductive film,
   and moving said conductive film continuously in the direction of its long dimension through said bath, whereby each point on said film is subjected to a varying density of electrodeposition current during its travel through the bath.

2. A process for forming a smooth durable magnetic film having an improved coercivity by the steps of:
   exposing a smooth elongated flexible nonconductive carrier having a conductive film superimposed on a surface thereof, said conductive film having a high initial resistance as a cathode to an aqueous electrodeposition bath including a salt of at least one member of a group comprising nickel and cobalt,
   applying an electrodeposition current to said conductive film,
   and moving the film continuously in the direction of its long dimension through said bath, the effective resistance of the conductive film being sufficiently high to cause the current density at each point on said film as it moves through the bath to vary between a magnitude exceeding the limiting current density for said magnetic film at the surface of the bath and a negligibly small magnitude at a certain distance along the path of the film below the bath surface.

3. A process for making an elongated magnetic recording medium having improved coercivity comprising the steps of:
   exposing an elongated nonconductive carrier having a conductive film superimposed on a surface thereof to an aqueous electrodeposition solution, said conductive film constituting a cathode having a high resistance, said aqueous solution including cobalt and hypophosphite ions,
   passing through said solution an electrodepositing current, the density of said current progressively changing along a length of said film in the solution from a value which is ample to cause electrodeposition of cobalt upon said carrier to a value which causes substantially no electrodeposition.
   and continuously moving the carrier in the direction of its long dimension through the solution during said electrodepositing process.

4. A process for forming a magnetic recording film having improved recording characteristics on an elongated carrier comprising the steps of:
   exposing an elongated plastic dielectric web having a thin conductive film superimposed on a surface thereof to an aqueous electrodeposition solution, said conductive film constituting a cathode having a resistance greater than the resistance of the solution, said aqueous solution including cobalt and hypophosphite ions, and said hypophosphite ion content being at least 0.15 grams per liter,
   continuously moving the web in the direction of its long dimension through said solution,
   and passing through said solution an electrodepositing current, the density of said current at the surface of the film progressively changing along a portion of said film due to the resistance of said film and having a value insignificant for electrodeposition over a length of said film in the solution.

5. A process as defined in claim 4 in which said aqueous solution includes cobalt, nickel and hypophosphite ions, with the ratio of cobalt to nickel ions being at least 0.6 to 1.

6. A process for making an improved magnetic recording impulse memory device suitable for recording and storing data at high density comprising the steps of:
   exposing an elongated plastic dielectric carrier having a nickel film superimposed on a surface thereof as a cathode to an aqueous electrodeposition solution, said solution comprising cobalt, nickel and hypophosphite ions, with the ratio of cobalt ions to nickel ions lying in the range between 0.6:1 and 1.45:1 and said hypophosphite ion content lying in the range between 0.15 and 12.3 grams per liter,
   passing through said solution and said nickel film an electrodepositing current, said film having a resistance of such magnitude as to cause the current density distribution along a given length of said carrier to vary above and below the limiting current density for the material being electrodeposited thereon,
   maintaining the solution at a pH falling within the range of 2.5 to 6.5,
   and moving the carrier at a substantially constant rate in the direction of its long dimension through said solution.

7. A process for making an improved magnetic recording impulse memory device suitable for the recording of data at high density comprising the steps of:
   exposing an elongated plastic dielectric carrier having a nickel film superimposed on a surface thereof as a cathode to an aqueous electrodeposition solution, said aqueous solution comprising cobalt and hypophosphite ions, said cobalt ion content lying within a range between 5.9 and 105 grams per liter and said hypophosphite ion content lying within the range between 0.15 grams per liter and saturation.
   passing an electrodepositing current through said nickel film and said solution, said nickel film having a resistance causing the density of said current at points along said carrier to vary both above and below the limiting current density for the material being electrodeposited thereon,
   and moving said carrier at a substantially constant rate in the direction of its long dimension through said solution to expose each incremental portion thereof to said varying current densities.

8. A process for making an improved recording impulse memory device suitable for the recording of data at high density comprising the steps of:

exposing an elongated dielectric carrier having a conductive film of high initial resistance superimposed on a surface thereof as at cathode to an aqueous electrodeposition bath including a salt of a magnetic metal, applying an electrodeposition current to said conductive film, and, continuously moving said carrier in the direction of its long dimension through said bath to electrodeposit a magnetic medium having a high coercivity and a hysteresis loop of a substantially square configuration on the surface of said conductive film, where the effective resistance of the conductive film is sufficiently high to cause the current density experienced along a portion of said film to vary between a magnitude exceeding the limiting current density for said magnetic medium at a point at the surface of said bath to a negligibly small magnitude at a point on said film below the bath surface.

References Cited by the Examiner

UNITED STATES PATENTS

| | | | |
|---|---|---|---|
| 1,522,291 | 1/1925 | Elmen | 204—43 |
| 2,494,954 | 1/1950 | Mason et al. | 204—28 |
| 2,532,283 | 12/1950 | Brenner | 204—48 |
| 2,532,284 | 12/1950 | Brenner | 204—48 |
| 2,583,101 | 1/1952 | Oliver. | |
| 2,619,454 | 11/1952 | Zapponi | 204—48 |
| 2,644,787 | 7/1953 | Bonn et al. | 204—43 |
| 3,032,486 | 5/1962 | Sallo et al. | 204—43 |
| 3,047,475 | 7/1962 | Hespenheide | 204—43 |

OTHER REFERENCES

Mohler et al.: "The Iron Age," July 17, 1947, pages 56–59 and 144.

JOHN H. MACK, *Primary Examiner.*

JOSEPH REBOLD, *Examiner.*